(12) United States Patent
Hatayama

(10) Patent No.: US 7,079,272 B2
(45) Date of Patent: Jul. 18, 2006

(54) PRINTING SYSTEM, CONTROLLER USED IN PRINTING SYSTEM, AND PRINTING APPARATUS

(75) Inventor: Fumihiro Hatayama, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 902 days.

(21) Appl. No.: 09/983,870

(22) Filed: Oct. 26, 2001

(65) Prior Publication Data

US 2002/0051199 A1 May 2, 2002

(30) Foreign Application Priority Data

Oct. 26, 2000 (JP) ............... P2000-327752

(51) Int. Cl.
*G06F 3/12* (2006.01)
(52) U.S. Cl. .............. 358/1.15; 358/1.14; 358/1.19
(58) Field of Classification Search ............. 358/1.15, 358/1.9, 1.14, 1.19
See application file for complete search history.

(56) References Cited

U.S. PATENT DOCUMENTS 5,978,559 A 11/1999 Quinion
6,650,431 B1 * 11/2003 Roberts et al. ............ 358/1.15

FOREIGN PATENT DOCUMENTS

| EP | 0 478 351 A2 | 4/1992 |
|---|---|---|
| EP | 0 529 808 A2 | 3/1993 |
| EP | 529808 A2 * | 3/1993 |
| JP | 7-64744 | 3/1995 |
| JP | 10-16344 | 1/1998 |
| JP | 11-119944 | 4/1999 |
| JP | 11-240227 | 9/1999 |
| WO | WO 97/46393 | 12/1997 |

* cited by examiner

Primary Examiner—Kimberly Williams
Assistant Examiner—Andrew Lam
(74) Attorney, Agent, or Firm—McDermott Will & Emery LLP

(57) ABSTRACT

A printing system, having a plurality of digital printing machines, capable of efficiently printing pages having different styles and preventing reduction of efficiency in bookbinding is provided. In the printing system having a plurality of printing machines, a controller selects a printing machine for printing every page on the basis of set information of page data included in book data so that pages having different styles can be printed by proper printing machines, whereby a burden on an operator can be reduced and an efficient printing operation can be implemented. Further, the controller of the printing system can make the printing machines execute various types of processing on portions corresponding to non-printed pages by transmitting printing non-execution information related to the non-printed pages to the printing machines when the printing machines for printing the respective pages are selected in response to condition information and the set information of the page data, whereby efficiency of a subsequent bookbinding step can be improved.

8 Claims, 14 Drawing Sheets

FIG.6

| | PAPER SIZE | PRINTING COLOR | PAPER TYPE | PRINTING DIRECTION |
|---|---|---|---|---|
| PRINTING MACHINE 21 | A4 | Y, M, C, K | COAT | VERTICAL |
| PRINTING MACHINE 22 | A4 | K | ORDINARY | VERTICAL |
| PRINTING MACHINE 23 | A3 | K | ORDINARY | HORIZONTAL |

FIG. 7B

| CONDITION INFORMATION JD1 (CONDITION 1) |
|---|
| PAPER SIZE : A4 |
| PRINTING COLOR : Y, M, C, K |
| PAPER TYPE : COAT |
| PRINTING DIRECTION : VERTICAL |
| CONDITION INFORMATION JD2 (CONDITION 2) |
| PAPER SIZE : A4 |
| PRINTING COLOR : K |
| PAPER TYPE : ORDINARY |
| PRINTING DIRECTION : VERTICAL |
| CONDITION INFORMATION JD3 (CONDITION 3) |
| PAPER SIZE : A3 |
| PRINTING COLOR : K |
| PAPER TYPE : ORDINARY |
| PRINTING DIRECTION : HORIZONTAL |

FIG. 8B

| OUTPUT PROCESSING INFORMATION DATA DD |
|---|
| ROTATION : VERTICAL |
| SIZE VARIATION : X:70% Y:70% |
| PAGE FIT : ON |
| COLOR CONVERSION : COLOR→MONOCHROME |
| PRINTING MACHINE : PRINTING MACHINE 22 |
| PD OUTPUT : — |

FIG.9

| BD1 |
|---|
| TOTAL PAGE NUMBER:4 |

| PD1 |
|---|
| PAPER SIZE:A3 |
| Dog. txt: (x1, y1) |
| Dog. tif: (x2, y2) |
| PRINTING COLOR:Y, M, C, K |
| PAPER TYPE:COAT |
| PRINTING DIRECTION:HORIZONTAL |

| PD2 |
|---|
| PAPER SIZE:A4 |
| : |
| : |
| : |
| PRINTING COLOR:Y, M, C, K |
| PAPER TYPE:COAT |
| PRINTING DIRECTION:VERTICAL |

| PD3 |
|---|
| PAPER SIZE:A4 |
| : |
| : |
| : |
| PRINTING COLOR:K |
| PAPER TYPE:ORDINARY |
| PRINTING DIRECTION:VERTICAL |

| PD4 |
|---|
| PAPER SIZE:A3 |
| : |
| : |
| : |
| PRINTING COLOR:K |
| PAPER TYPE:ORDINARY |
| PRINTING DIRECTION:HORIZONTAL |

FIG. 11A

| 21 | RPD1'(PD1) : 0 | RPD2 (PD2) : 1 | RPD3 (PD3) : 0 | RPD4 (PD4) : 0 |
|---|---|---|---|---|
| 22 | RPD1'(PD1) : 1 | RPD2 (PD2) : 0 | RPD3 (PD3) : 1 | RPD4 (PD4) : 0 |
| 23 | RPD1'(PD1) : 0 | RPD2 (PD2) : 0 | RPD3 (PD3) : 0 | RPD4 (PD4) : 1 |

FIG. 11B

| PD1' : 22 |
|---|
| PD2 : 21 |
| PD3 : 22 |
| PD4 : 23 |

PRINTING SYSTEM, CONTROLLER USED IN PRINTING SYSTEM, AND PRINTING APPARATUS

BACKGROUND OF THE INVENTION

1. Field of the Invention

The present invention relates to a printing system, and more specifically, it relates to a controller for printing page data having different structures in respective printing machines in a printing system having a plurality of printing machines and the printing machines of the printing system, as well as a controller control method for the printing system, a recording medium and a program.

2. Description of the Background Art

Printed matter such as a magazine or a pamphlet including a plurality of pages generally has various styles for color pages, monochrome pages, facing pages, pages in different printing directions and the like in a mixed state. In order to prepare the printed matter including such a plurality of pages having different styles, therefore, a printing machine capable of printing all of the pages having different styles is generally employed. As to printed matter including color pages and monochrome pages in a mixed state, for example, a color printing machine can print the color pages and the monochrome pages respectively. As to printed matter including facing pages, a printing machine capable of performing printing on a paper of the size for the facing pages can print the facing pages and ordinary pages respectively.

In consideration of efficiency, however, it is problematic to print such pages having different styles by a single printing machine capable of printing all of the pages. It follows that a color printing machine printing monochrome pages wastefully supplies color ink when the number of the monochrome pages is remarkable. When papers having the size for facing pages are employed for printing ordinary pages, non-printed parts of the papers must be cut in a later step, to result in waste of the papers.

In consideration of efficiency, therefore, it is desirable to print pages having different styles by a plurality of printing machines.

In general, information for printing is recently computerized for saving resources, improving efficiency and implementing sharing. The printed matter including a plurality of pages as described above can be computerized as document data maintaining the original styles of the printed matter in a file format such as PDF (portable document format), for example. In other words, printed matter including pages such as color pages and monochrome pages having different numbers of printing colors, facing pages different in size from the remaining pages or pages in different printing directions can also be stored as single document data when converted to a computerized file of the PDF system by scanning. It is also possible to create document data stored in a computerized file of the PDF system from the start, as a matter of course.

On the printing site, therefore, a film output as a result of prepress, referred to as a saving press, is computerized to be preserved as single document data, which in turn is employed for reprinting.

Therefore, it is preferable to employ a plurality of digital printing machines capable of directly printing computerized document data for performing printing with the document data.

When printing single computerized document data according to prior art, however, trouble is caused as to printing of the pages having different styles stored in the document data.

In order to correctly express the styles of the pages stored in the document data respectively, for example, an operator must specify digital printing machines for printing the respective pages in consideration of the styles of the pages. In other words, the operator must specify a digital printing machine capable of performing color printing for color pages, while specifying a digital printing machine capable of employing large-sized pages for facing pages. Such a specifying operation not only increases the burden on the operator but also causes a problem such as reduction of efficiency resulting from an operation error resulting from the specifying operation or increase of the cost.

Also when performing printing on pages to be printed on printing papers of a type different from the remaining pages, trouble similar to the above is caused since single computerized document data cannot cope with this.

Even if a plurality of digital printing machines are prepared, the document data may include pages having a style unprintable by the digital printing machines. While processing such as size variation, rotation or color conversion must be performed in this case so that the pages can be printed by any of the digital printing machines, unintended processing may be performed on the printed pages in the prior art due to previously uniformly set processing. Further, the operator must select and set the proper digital printing machine every page, and hence the burden on the operator is increased.

When performing bookbinding after printing the document data by the plurality of digital printing machines, in addition, arrangement of the pages forming the printed matter cannot be maintained due to the printing of the pages by the digital printing machines, and hence efficiency is disadvantageously reduced also as to the bookbinding operation.

SUMMARY OF THE INVENTION

The present invention is directed to a printing system capable of printing a plurality of pages forming a book.

According to the present invention, the printing system comprises a) a plurality of printing apparatuses, b) a terminal creating book data including a plurality of page data and printing set information, and c) a controller comprising an element receiving the said book data from the said terminal, an element performing RIP processing on the said plurality of page data for creating a plurality of printing data respectively, an element specifying allocation of the said plurality of printing data to the said plurality of printing apparatuses, and an element distributing the said plurality of printing data to the said plurality of printing apparatuses according to the said allocation, while each printing apparatus forms an image on a paper on the basis of objective printing data received from the said controller.

According to a preferred embodiment of the present invention, the said printing condition information includes part or all of information specifying the size of a printing paper, the number of printed colors, the type of the printing paper and a page printing direction.

Preferably, page data having the said printing set information mismatching with the said printing condition information is converted to proper page data printable in any of the said plurality of printing apparatuses.

Preferably, the result of the said allocation is displayed.

According to an aspect of the present invention, the controller further comprises an element dividing a plurality of pages into a printing objective page and a non-objective page according to the said allocation as to each of the said printing apparatuses, and an element creating composite data by supplying printing data extracted from the said plurality of printing data to the said printing objective page while supplying a page skip signal to the said non-objective page and transmitting the said composite data to the said printing apparatuses.

The controller decides a printing apparatus for performing printing every page by holding the printing condition information. The operator may not specify the printing conditions and the printing apparatus every page in printing, whereby the efficiency of the printing operation is improved. Each printing apparatus changes an ejection position corresponding to the non-objective page or inserts a slip paper on the basis of the page skip signal transmitted from the controller, whereby the efficiency of a bookbinding operation in a subsequent step is improved.

Accordingly, an object of the present invention is to efficiently print pages having different styles.

Another object of the present invention is to prevent reduction of efficiency in bookbinding.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram for illustrating a printing machine management table 1751 in a state acquiring information related to digital printing machines 21 to 23 forming the printing machine group 2;

FIGS. 7A and 7B are diagrams for showing the structures of a condition information entry menu MJJ and condition information data JD created by inputting condition information;

FIGS. 8A and 8B are diagrams for showing the structures of an output processing entry menu MDJ and output processing information DD created by inputting output processing;

FIG. 9 is a diagram for illustrating exemplary structures of page data PD and book data BD;

FIGS. 11A and 11B are diagrams for showing exemplary page data printing allocation information WD created by a page data printing allocation information creation part 177 and exemplary display page data printing allocation information HWD.

DESCRIPTION OF THE PREFERRED EMBODIMENTS

Figure 1:
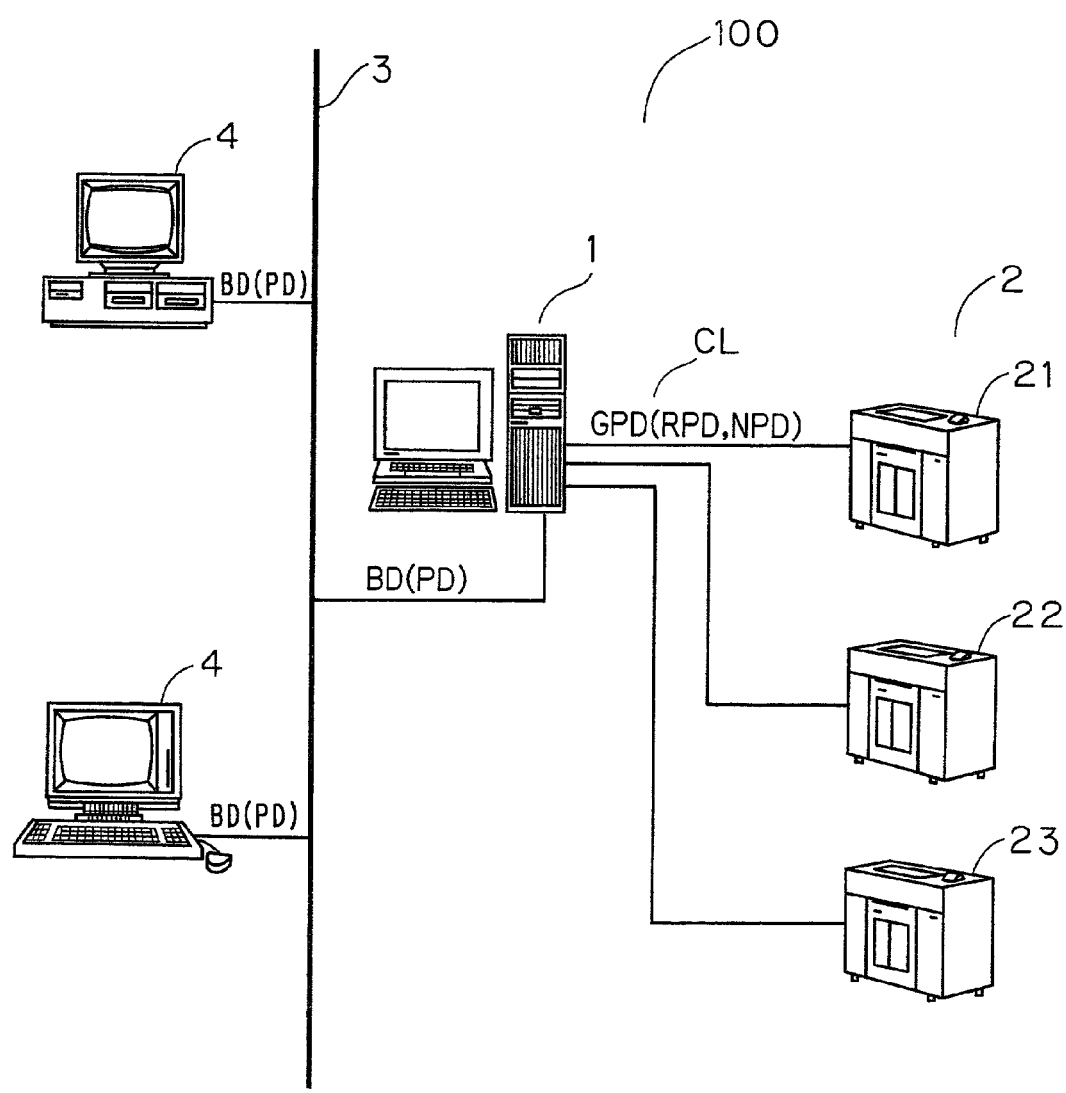
FIG. 1 is a diagram for illustrating a printing system 100 according to the present invention.

FIG. 1 is a diagram for illustrating a printing system 100 according to the present invention. The printing system 100 is formed by a controller 1, a printing machine group 2 consisting of printing machines 21, 22 and 23, and terminals 4. The controller 1 and the printing machine group 2 are connected with each other through communication lines CL. The controller 1 and the terminals 4 are connected with each other through a network 3.

Each terminal 4 is used for creating book data BD consisting of page data PD. The page data PD is created by layout software (not shown) stored in the terminal 4. The page data PD is a data file described in a page description language such as Post Script (registered trademark by Adobe Systems Incorporated, U.S.A.) or a PDF system data file. The book data BD is a document file storing the page data PD therein. When described in a page description language, the book data BD is a file including the page data PD described in a page description language or a file storing link statements corresponding to the respective ones of the page data PD. When formed by a data file of the PDF system, the book data BD includes page data PD of the PDF system therein.

The book data BD created in the terminal 4 is transmitted to the controller 1 through the network 3.

The book data BD may alternatively be formed in the controller 1 from the page data PD transmitted from each terminal 4.

The controller 1 controls the printing machine group 2. The controller 1 analyzes the transmitted book data BD, rasterizes the page data PD forming the book data BD and creates printing data RPD corresponding to the page data PD. The created printing data RPD is transmitted to the printing machine group 2 through the communication lines CL. At this time, the controller 1 decides any of the digital printing machines 21, 22 and 23 of the printing machine group 2 for printing the printing data RPD. The controller 1 also transmits printing non-execution information to the printing machine group 2 through the communication lines CL.

The printing machine group 2 is formed by the digital printing machines 21, 22 and 23 capable of receiving the printing data RPD transmitted from the controller 1 and printing the contents of the printing data RPD directly on printing papers. The digital printing machines 21, 22 and 23 have different specifications respectively. The digital printing machine 21 is a multicolor digital printing machine capable of printing four colors (yellow, magenta, cyan and black). It is assumed that a feeding cassette stores A4 coat papers for color printing. It is assumed that the digital printing machine 22 is a digital printing machine for monochrome printing, and a feeding cassette stores A4 plain papers. It is assumed that the digital printing machine 23 is a digital printing machine for monochrome printing similarly to the digital printing machine 22, while a feeding cassette thereof stores A3 plain papers. The respective digital printing machines 21, 22 and 23 receive the printing non-execution information transmitted from the controller 1 through the communication lines CL, and perform prescribed processing related to non-printed page positions on the basis thereof. The printing machine group 2 may alternatively be connected with the controller 1 through the network 3.

Figure 2:
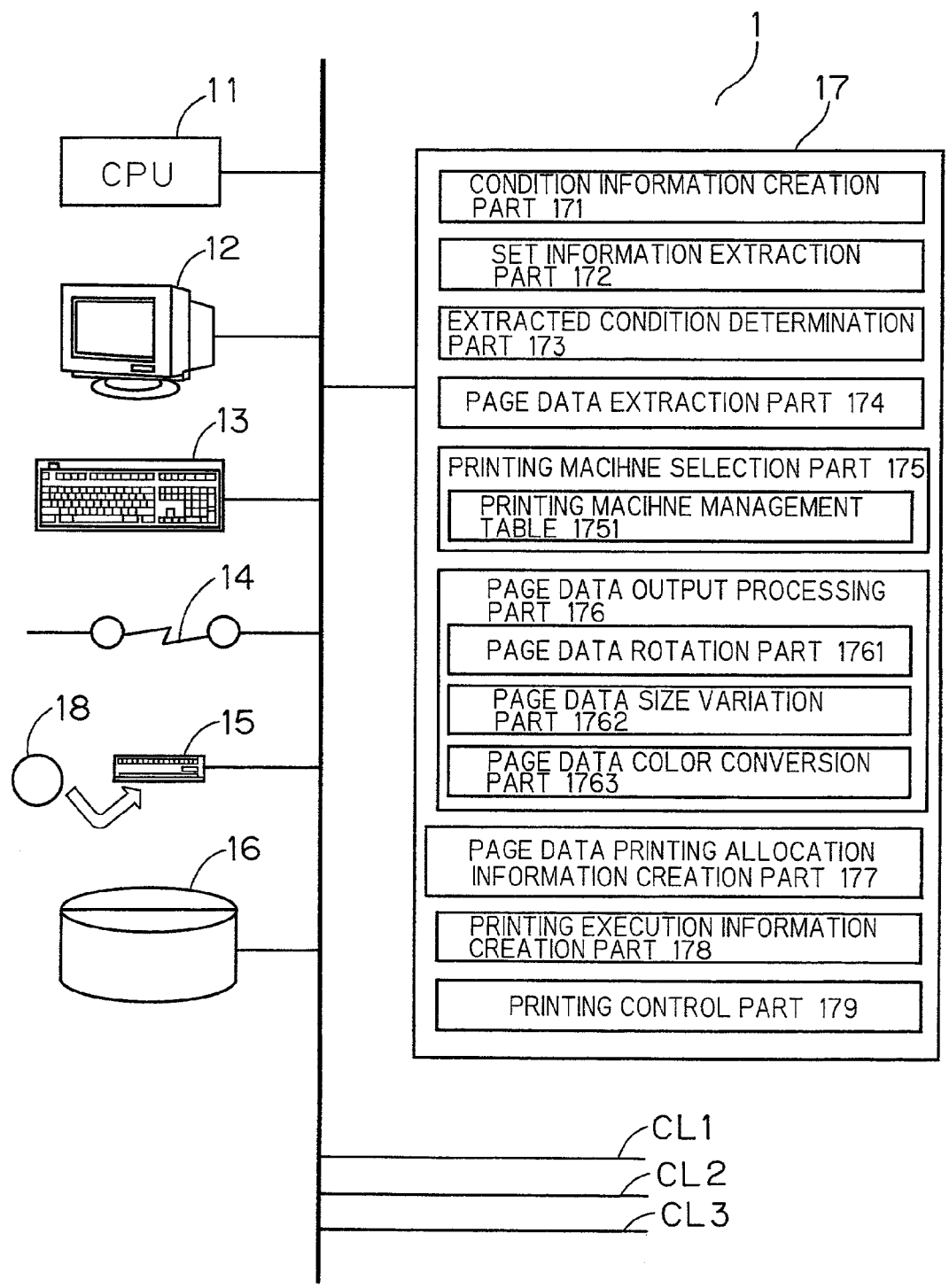
FIG. 2 is a diagram for showing the structure of a controller 1.

FIG. 2 is a diagram for showing the structure of the controller 1. The controller 1, which is a generally used personal computer, is formed by a CPU 11, a display part 12, an input part 13, a network I/F 14, a media drive 15, a storage part 16, a memory 17 and the communication lines CL. The CPU 11 controls the overall controller 1, and executes a program recorded in the media disk 18 inserted in the media drive 15 in the memory 17 in particular, thereby implementing functions of the controller 1. The display part 12 is used for displaying necessary information when executing printing by receiving the book data BD from the terminal 4 and displaying allocation of the printing data RPD to the digital printing machines 21, 22 and 23 forming the printing machine group 2. The input part 13, formed by a mouse and a keyboard, is used by the operator for entering instructions in the controller 1. The network I/F 14 connects the controller 1 with the network 3. Through this network I/F 14, the controller 1 receives the book data BD or the page data PD from each terminal 4 connected to the network 3. It is also possible to download a program implementing the functions of the controller 1 from a server (not shown). When the printing machine group 2 is connected with the controller 1 through the network 3, the printing data RPD and printing non-execution information NPD are transmitted to the printing machine group 2 through the network I/F 14. The media drive 15 is used for reading the program recorded in the media disk 18. The program read by the media drive 15 implements the functions of the controller 1. When the controller 1 operates offline from the terminal 4, the media disk 18 records the book data BD created by the terminal 4. Therefore, the media drive 15 may read the media disk 18 thereby performing subsequent processing. The storage part 16 stores the program read by the media drive 15. The storage part 16 also stores the book data BD, the page data PD and the printing data RPD. The communication lines CL are used for communication with the digital printing machines 21, 22 and 23 forming the printing machine group 2. The communication lines CL, prepared for the respective digital printing machines 21, 22 and 23, are formed by communication lines CL1, CL2 and CL3.

The memory 17 is a working area where the CPU 11 executes the program stored by the storage part. The CPU 11 executes the program, thereby implementing functions of a condition information creation part 171, a set information extraction part 172, an extracted condition determination part 173, a page data extraction part 174, a printing machine selection part 175, a page data output processing part 176, a page data printing allocation information creation part 177, a printing execution information creation part 178 and a printing control part 179 in the memory 176.

The condition information creation part 171 creates condition information for allocating the page data PD to be printed to the digital printing machine 21, 22 or 23 forming the printing machine group 2. When the operator inputs conditions such as a paper size, colors forming a printed image (number of printing colors), the type of printing papers, a printing direction etc. necessary for selecting the printing machine 21, 22 or 23 for printing the page data PD included in the book data BD, the condition information creation part 171 creates the condition information for selecting the printing machine 21, 22 or 23.

When the book data BD already stores information for selecting the printing machine 21, 22 or 23 in the terminal 4, the condition information creation part 171 reads this information from the book data BD and creates condition information on the basis thereof.

The set information extraction part 172 extracts set information for the page data PD included in the book data BD transmitted from the terminal 4. Each page data PD has information related to the paper size, information related to the number of printing colors forming the printed image, information related to the printing direction etc. Further, information related to the type of the papers for printing the page data PD may be appended to the book data BD. The set information extraction part 172 extracts the set information referred to in printing from the book data BD or the page data PD for selecting the printing machine 21, 22 or 23.

The extracted condition determination part 173 compares the condition information created in the condition information creation part 171 with the set information extracted by the set information extraction part 172. When the condition information and the set information match with each other, page data extraction described later is performed as to the page data PD having this set information.

When the condition information mismatches with the set information in the determination by the extracted condition determination part 173, it follows that no extraction is performed as to the page data PD having this set information, while processing in this case is described later.

The page data extraction part 174 extracts the page data PD from the book data BD. An RIP part (not shown) rasterizes the extracted page data PD and creates the printing data RPD. The printing machine selection part 175 described below selects the digital printing machine 21, 22 or 23 for printing the created printing data RPD.

The printing machine selection part 175 selects the printing machine 21, 22 or 23 for printing the page data PD extracted by the page data extraction part 174. The printing machine selection part 175 comprises a printing machine management table 1751 storing information related to the printing machine group 2 connected to the controller 1.

The printing machine management table 1751 stores information as to the specifications such as paper sizes, numbers of printing colors, types of papers and printing directions, for example, of the digital printing machines 21, 22 and 23 forming the printing machine group 2 connected to the controller 1.

The printing machine selection part 175 refers to the information related to the printing machine group 2 stored in the printing machine management table 1751 and compares the condition information with the set information of the page data PD, thereby selecting the printing machine 21, 22 or 23 for printing the printing data RPD after rasterizing the page data PD.

When change of the type of the printing papers for the page data PD is specified, the printing machine selection part 175 refers to the information stored in the printing machine management table 1751 for selecting the printing machine 21, 22 or 23 storing the papers.

When the extracted condition determination part 173 determines that the book data BD includes page data PD having set information mismatching with the condition information created by the condition information creation part 171 or the printing machine selection part 175 does not select the printing machine 21, 22 or 23 for printing the page data PD having the set information matching with the condition information, the page data output processing part 176 performs output processing on the page data PD so that the printing data RPD can be created from the page data PD and printed by any of the digital printing machine 21, 22 and 23 forming the printing machine group 2. Therefore, the page data output processing part 176 comprises a page data rotation part 1761, a page data size variation part 1762 and a page data color conversion part 1763.

The page data rotation part 1761 performs rotation processing on the page data PD for changing the printing direction of the page data PD. If the printing machine 21, 22 or 23 vertically sets an A4 paper and the page data PD includes information for horizontally setting an A4 paper, for example, the paper gets insufficient in an intermediate potion of the page when printing is performed with the printing data RPD created from the page data PD. In order to prevent this, the page data rotation part 1761 performs rotation processing on the page data PD for guaranteeing printing by the digital printing machine 21, 22 or 23.

The page data size variation part 1762 performs size variation processing on the page data PD for changing the paper size of the page data PD. If the digital printing machine 21, 22 or 23 employs A4 papers for printing and the paper size of the page data PD is A3, for example, inconvenience results from mismatch between the paper sizes of the digital printing machine 21, 2 or 23 and the page data PD when printing is performed with the printing data RPD created from the page data PD. In order to prevent this, the page data size variation part 1762 performs size variation processing on the page data PD for guaranteeing printing by the digital printing machine 21, 22 or 23.

The page data color conversion part 1763 performs color conversion on the page data PD for changing the number of printing colors for the page data PD. When the printing machine 21, 22 or 23 performs four-color (YMCK) printing and the contents of the page data PD include a specific color other than Y, M, C and K, for example, inconvenience results from the incapability of printing the specific color by the four-color printing machine 21, 22 or 23 if performing printing by the printing data RPD created from the page data PD. In order to prevent this, the page data color conversion part 1763 performs color conversion on the page data PD for guaranteeing printing by the digital printing machine 21, 22 or 23.

The page data output processing part 176 executes processing of printing contents of the page data PD unprintable by the printing system 100 by any of the digital printing machines 21, 22 and 23 forming the printing machine group 2.

The page data output processing part 176 may alternatively transmit the page data PD unprintable by the printing system 100 to another printing system without performing output processing.

The page data printing allocation information creation part 177 creates page data printing allocation information for the printing data RPD printed in the printing machine group 2. Since the printing machine selection part 175 selects the digital printing machine 21, 22 or 23 for printing the page data PD, the page data printing allocation information creation part 177 also creates information as to the page data PD printed by each digital printing machine 21, 22 or 23 in the printing machine group 2. The created page data printing allocation information is displayed on the display part 12 so that the operator can confirm the contents thereof. Alternatively, any of the digital printing machines 21, 22 and 23 forming the printing machine group 2 may print the page data printing allocation information.

The printing execution information creation part 178 creates printing execution information including the printing data PRD printed in each digital printing machine 21, 22 or 23 and printing non-execution information NPD inserted in place of unprinted printing data RPD on the basis of the page data printing allocation information. The printing non-execution information NPD included in the printing execution information is a control signal for making each digital printing machine 21, 22 or 23 execute ejection processing based on the unprinted printing data RPD specified by the printing non-execution information NPD.

The printing control part 179 transmits the printing execution information consisting of the printing data RPD and the printing non-execution information NPD to each digital printing machine 21, 22 or 23 selected by the printing machine selection part 175. The digital printing machine 21, 22 or 23 receiving the printing execution information executes printing based on the printing data RPD, while executing ejection processing on the basis of the printing non-execution information NPD.

Figure 3:
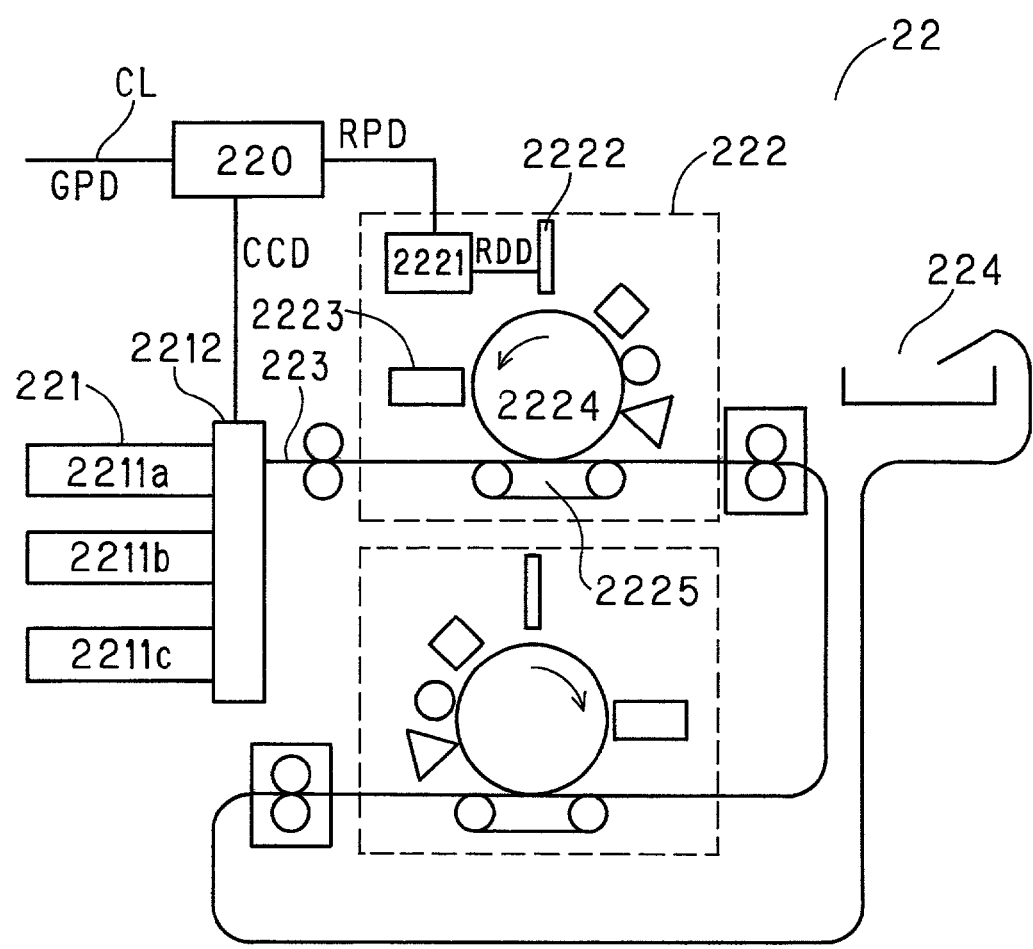
FIG. 3 is a diagram for illustrating the structure of a digital printing machine 22 included in a printing machine group 2.

FIG. 3 is a diagram for illustrating the structure of the digital printing machine 22 forming the printing machine group 2. The digital printing machine 22 comprises a control part 220, a feeding part 221, a printing part 222, a transport path 223 and a stacker 224.

The control part 220 receives printing execution data GPD transmitted from the controller 1 through the communication line CL2. The control part 220 transmits the printing data RPD stored in the received printing execution data GPD to the printing part 222. In response to the control part 220 receiving the printing execution data GPD, the feeding part 221 starts feeding printing papers PA.

The feeding part 221 is formed by a plurality of feeding cassettes 2211 and a supply part 2212 for feeding papers from the respective feeding cassettes 2211. Identification codes are supplied to the feeding cassettes 221 respectively, thereby enabling the controller 1 to identify the feeding cassettes 2211. It is assumed that the three feeding cassettes 2211 forming the digital printing machine 22 shown in FIG. 3 are supplied with identification codes "a", "b" and "c" respectively. Each of the feeding cassettes 2211*a* and 2211*b* stores a plurality of printing papers PA. The feeding cassette 2211*c* stores slip papers PAA to be inserted into positions corresponding to pages not printed by the digital printing machine 22 in place of the printing papers PA. The supply part 2212 switches the feeding cassettes 2211 under control of the control part 220, for drawing out the printing papers PA or the slip papers PAA stored in any feeding cassette 2211 one by one. The printing papers PA or the slip papers PAA supplied from the feeding cassette 2211 by the supply part 2212 are transported to the printing part 222 through the transport path 223.

The printing part 222 comprises a driver 2221 driving a light source 2222 on the basis of a binary halftone dot signal RDD, the light source 2222 for exposing an image based on the binary halftone dot signal RDD on an exposure drum 2224, a developing part 2223 developing the image recorded on the exposure drum 2224 by the light source 2222, the exposure drum 2224 for transferring the developed image onto the printing papers PA and an impression cylinder 2225. First, the driver 2221 converts the printing data RPD to the binary halftone dot signal RDD for ON/OFF-controlling the light source 2222. The light source 2222 intermittently emits a beam under this control, thereby partially discharging the exposure drum 2224 uniformly charged with positive or negative charges by a charger (not shown) for forming an electrostatic latent image corresponding to the page data PD on the exposure drum 2224 as a result. The developing part 2223 sticks toner charged with charges of the same polarity as the exposure drum 2224 on the exposure drum 2224, thereby forming a printing image on the exposure drum 2224 with the toner. The exposure drum 2224 formed with the printing image with the toner by the developing part 2223 is rotated along arrow thereby transferring the printing image formed by the toner onto the printing papers PA transported to the printing part 2222 through the transport path 223. A fixing part (not shown) fixes the toner to the printing papers PA, thereby completing printing on the printing papers PA. Thereafter the printing papers PA are further transported through the transport path 223, and ejected to the stacker 224.

The control part 220 outputs a cassette switching signal CCD for switching the feeding cassettes 2211 to the feeding part 221 on the basis of the printing non-execution information NPD stored in the printing execution data GPD. The supply part 2212 receiving the cassette switching signal CCD changes the feeding cassette 2211 for feeding the papers PA or PAA. When the feeding cassette 2221a feeds the printing papers PA, the supply part 2212 receiving the cassette switching signal CCD switches the feeding cassette 2211a to the feeding cassette 2211c storing the slip papers PAA, for drawing out one of the slip papers PAA and supplying the same to the transport path 223. This slip paper PAA, supplied to the printing part 222 by the transport path 223 similarly to the printing papers PA, is not subjected to printing but ejected to the stacker 224 since no printing data RPD is transmitted from the control part 220. Since the slip paper PAA is different from the printing papers PA, it is possible to readily confirm that the portion where the slip paper PAA is inserted is not subjected to printing. When the printing execution data GPD stores the printing data RPD subsequently to the printing non-execution information NPD, the control part 220 transmits another cassette switching signal CCD for switching the feeding cassettes 2211 to the feeding part 221. The supply part 2212 switches the feeding cassette 2211c to the feeding cassette 2211a according to this cassette switching signal CCD, for transporting the printing papers PA to the printing part 222 and restarting printing.

Figure 4A:
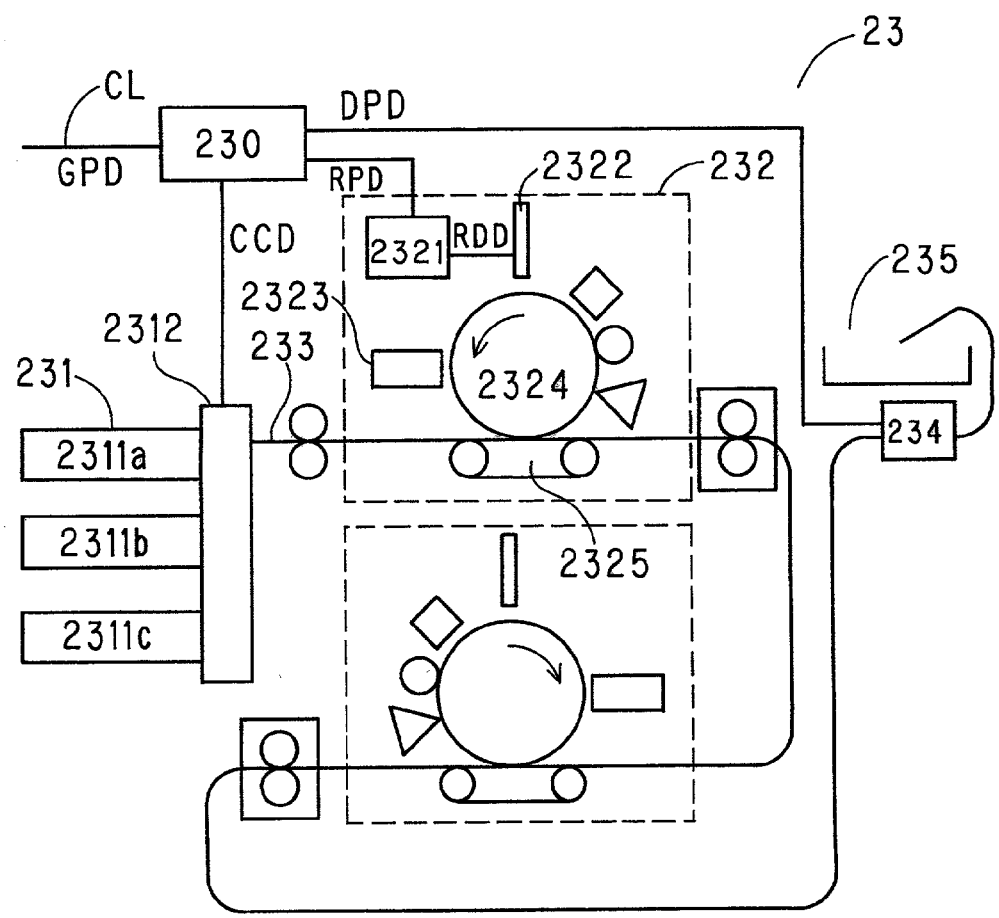
FIGS. 4A and 4B are diagrams for illustrating the structure of another digital printing machine 23 included in the printing machine group 2.

The digital printing machine 22 may alternatively have an ejection position change function. FIG. 4A is a diagram for illustrating the structure of the digital printing machine 23 forming the printing machine group 2. The digital printing machine 23 comprises a control part 230, a feeding part 231, a printing part 232, a transport path 233, an ejection position change mechanism 234 and a stacker 235.

The control part 230 has a function similar to that of the control part 220 of the digital printing machine 22 described with reference to FIG. 3, as well as a function of creating an ejection position change signal DPD in response to the printing non-execution information NPD stored in the received printing execution data GPD and transmitting the ejection position change signal DPD to the ejection position change mechanism 234. The feeding part 231 and the printing part 232 have functions similar to those of the aforementioned feeding and printing parts 221 and 222, and hence redundant description is omitted.

Figure 4B:
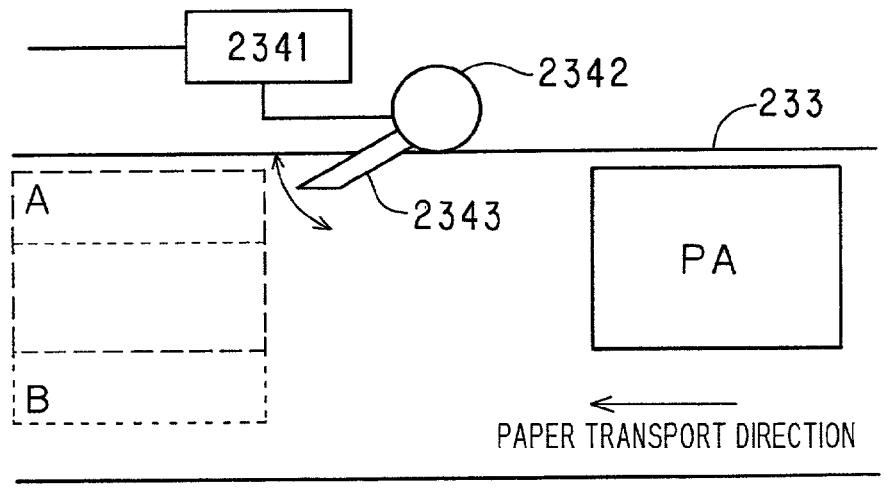

The transport path 233 successively transporting printed printing papers PA to the stacker 235 comprises the ejection position change mechanism 234 on an intermediate portion thereof. The ejection position change mechanism 234 receives the ejection position change signal DPD transmitted from the control part 230, thereby changing the position for ejecting the printing papers PA. FIG. 4B shows the ejection position change mechanism 234 in an enlarged manner. The ejection position change mechanism 234 comprises a driver 2341, a motor 2342 and an ejection position change arm 2343. When the driver 2341 receives the ejection position change signal DPD transmitted from the control part 230, the driver 2341 generates a driving signal for driving the motor 2342. The motor 2342 operates on the basis of the driving signal, for driving the ejection position change arm 2343. The ejection position change arm 2343 is generally held to be in contact with a wall side surface of the transport path 233, so that the printing papers PA transported through the transport path 233 straightly move while keeping a position A in the transport path 233, to be ejected to the stacker 235. When the ejection position change arm 2343 is driven to the illustrated position through the ejection position change signal DPD, the printing papers PA transported through the transport path 233 move to a position B in the transport path 233 due to resistance of the ejection position change arm 2343, to straightly move and be ejected to the stacker 235. When the control part 230 stops transmitting the ejection position change signal DPD, the driver 2341 generates a driving signal for driving the motor 2342 again. The motor 2342 returns the ejection position change arm 2343 to the position in contact with the wall side surface of the transport path 233 on the basis of the driving signal. Thus, the printing papers PA thereafter transported through the transport path 233 are ejected to the stacker 235 while keeping the position A in the transport path 233.

The structure of the ejection position change part 234 employable for the digital printing machine 23 is not restricted to the aforementioned example. When a roller obliquely set on the floor face of the transport path 233 is driven by the ejection position change signal DPD, for example, the position for ejecting the printing papers PA to the stacker 235 can be changed similarly to the above. When a mechanism for sliding the stacker 235 by the ejection position change signal DPD is added, the position for ejecting the printing papers PA can be similarly changed.

Figure 5:
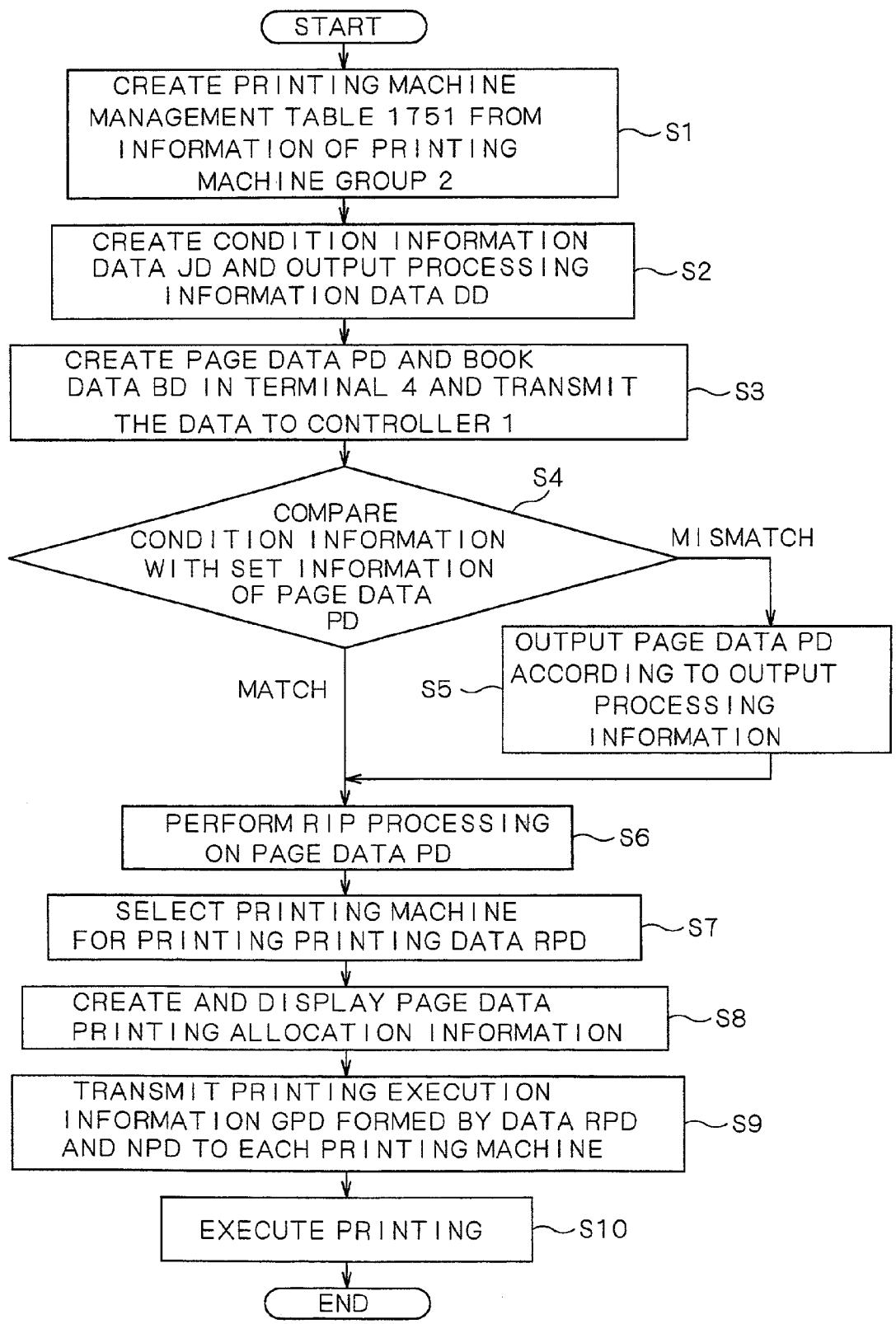
FIG. 5 is a flow chart for illustrating operations of the printing system 100.

FIG. 5 is a flow chart for illustrating operations of the printing system 100.

First, the controller 1 acquires information related to the digital printing machines 21, 22 and 23 forming the printing machine group 2 at a step S1.

FIG. 6 is a diagram for illustrating the printing machine management table 1751 acquiring the information related to the digital printing machines 21 to 23 forming the printing machine group 2. The operator operates the input part 13 thereby entering the information related to the digital printing machines 21 to 23 in the printing machine management table 1751 provided in the printing machine selection part 175 of the controller 1. The information to be entered includes the names of the connected digital printing machines 21 to 23, the sizes of the printing papers PA stored in the digital printing machines 21 and 23, the types of colors printable by the digital printing machines 21 to 23, the types of the stored printing papers PA, the printing directions of the printing papers PA etc. The operator enters the digital printing machines 21, 22 and 23 as the names of the digital printing machines 21 to 23 connected to the controller 1. The operator further enters "A4" as the size of the printing papers PA stored in the digital printing machine 21, "YMCK" as the types of printable colors, "coat paper" as the type of the stored printing papers PA and "vertical" as the printing direction. The operator similarly enters information related to the digital printing machines 22 and 23, thereby filling up the printing machine management table 1751, and it follows that the controller 1 acquires the information related to the digital printing machines 21 to 23.

When the digital printing machines 21 to 23 connected to the controller 1 are intelligent digital printing machines having functions of managing the states of their own, the controller 1 may acquire the information on the digital printing machines 21 to 23 through the communication lines CL1 to CL3.

The controller 1 creates condition information and output processing information at a step S2. The operator enters desired items through the input part 13 when printing the page data PD, so that the condition information creation part 171 and the page data output processing part 176 of the controller 1 create the condition information and the output processing information.

Figure 7A:
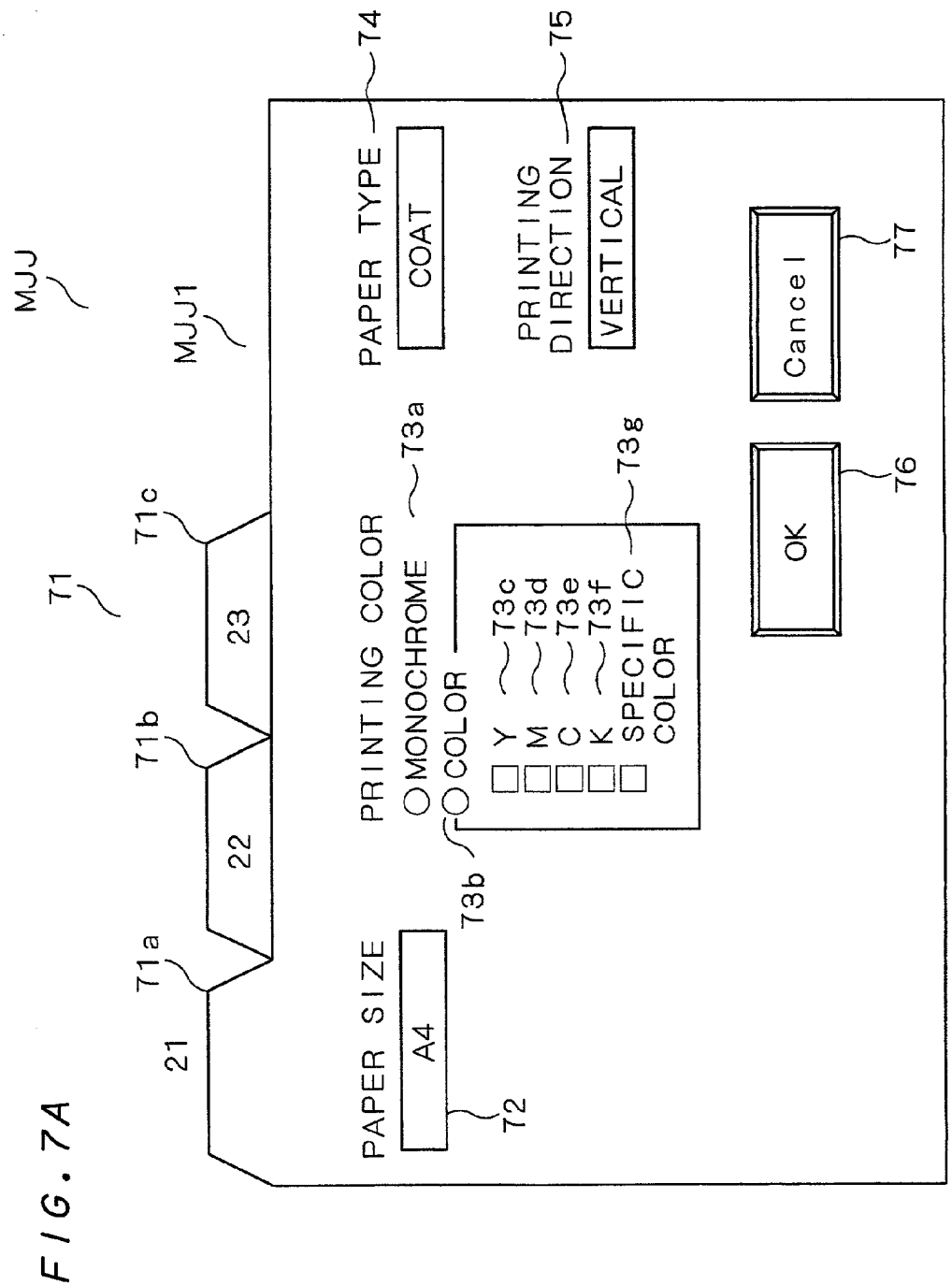

FIG. 7A shows a condition information entry menu MJJ. The condition information entry menu MJJ comprises tabs 71, a paper size entry field 72, printing color selection buttons 73, a paper type entry field 74, a printing direction entry field 75, an OK button 76 and a cancel button 77 as entry items used for creating the condition information. The condition information entry menu MJJ is displayed on the display part 12 as that formed by superposing condition information entry menus MJJ1, MJJ2 and MJJ3 comprising the same entry items respectively by the condition information creation part 171.

The tabs 71 are used for switching the condition information entry menu MJJ. As described above, the condition information entry menu MJJ is displayed as that formed by superposing the condition information entry menus MJJ1 to MJJ3. When the operator presses the tabs 71 through the input part 13, the condition information entry menu MJJ can be switched between the condition information entry menus MJJ1 to MJJ3. The condition information creation part 171 acquires the information of the digital printing machines registered in the printing machine management table 1751 thereby clarifying the number of the digital printing machines connected to the controller 1, for displaying the tabs 71 in correspondence to the number of the digital printing machines connected to the controller 1. Referring to FIG. 7A, three tabs 71a, 71b and 71c are displayed in correspondence to the three digital printing machines 21 to 23 connected to the controller 1.

The paper size entry field 72 is used for entering the paper sizes for printing the pages. The operator enters the desired paper sizes for printing the pages in the paper size entry field 72, so that the condition information creation part 171 acquires information related to the printing papers PA.

The printing color selection buttons 73 are used for entering numbers of printing colors for printing the pages. The printing color selection buttons 73, consisting of a monochrome printing button 73a and a color printing button 73b, are formed by a Y plate printing button 73c, an M plate printing button 73d, a C plate printing button 73e, a K plate printing button 73f and a specific color printing button 73g. The operator operates the input part 13 for entering desired numbers of colors for page printing by pressing any printing color selection button 73. When the monochrome printing button 73a is pressed, the printing color for printing the pages is reflected on the created condition information as monochromatic. When the color printing button 73b is pressed, printing colors for page printing are reflected on the created condition information by pressing any or all of the buttons 73c to 73g.

The monochrome printing button 73a and the color printing button 73b cannot be simultaneously pressed.

The paper type entry field 74 is used for entering the types of papers for printing the pages. The operator enters desired types of papers for page printing in the paper type entry field 74, so that the condition information creation part 171 acquires information related to the printing papers PA.

The printing direction entry field 75 is used for entering printing directions of the pages. The operator enters desired printing directions of the papers for page printing in the printing direction entry field 75, so that the condition information creation part 171 acquires information related to the printing papers PA.

When completely entering the conditions of desired printing contents through the tab 71a, the operator presses the tabs 71b and 71c at need for switching the menu to the condition information entry menu MJJ2 or MJJ3 for entering further conditions. When completely entering these conditions, the operator presses the OK button 76 for ending the entry in the condition information creation part 171. Consequently, the condition information creation part 171 creates condition information data JD from the entered contents. In order to end the entry in an intermediate stage or when not satisfied with the entered condition information data JD, the operator presses the cancel button 77 for interrupting the condition entry.

FIG. 7B shows the structure of the condition information data JD created by the condition information creation part 171 from the entry through the condition information entry menu MJJ. As shown in FIG. 7B, the condition information data JD stores conditions 1 to 3 storing information as to paper sizes, numbers of printing colors, types of papers and printing directions respectively.

Thus, when the operator enters desired items in the condition information entry menu MJJ as to printed pages, the condition information creation part 171 creates the condition information referred to for printing the page data PD.

However, there may possibly be page data PD mismatching with the condition information, i.e., page data PD unprintable by the printing machine group 2 as such. Therefore, it may be necessary to perform output processing on the page data PD for enabling printing by the printing machine group 2.

Figure 8A:
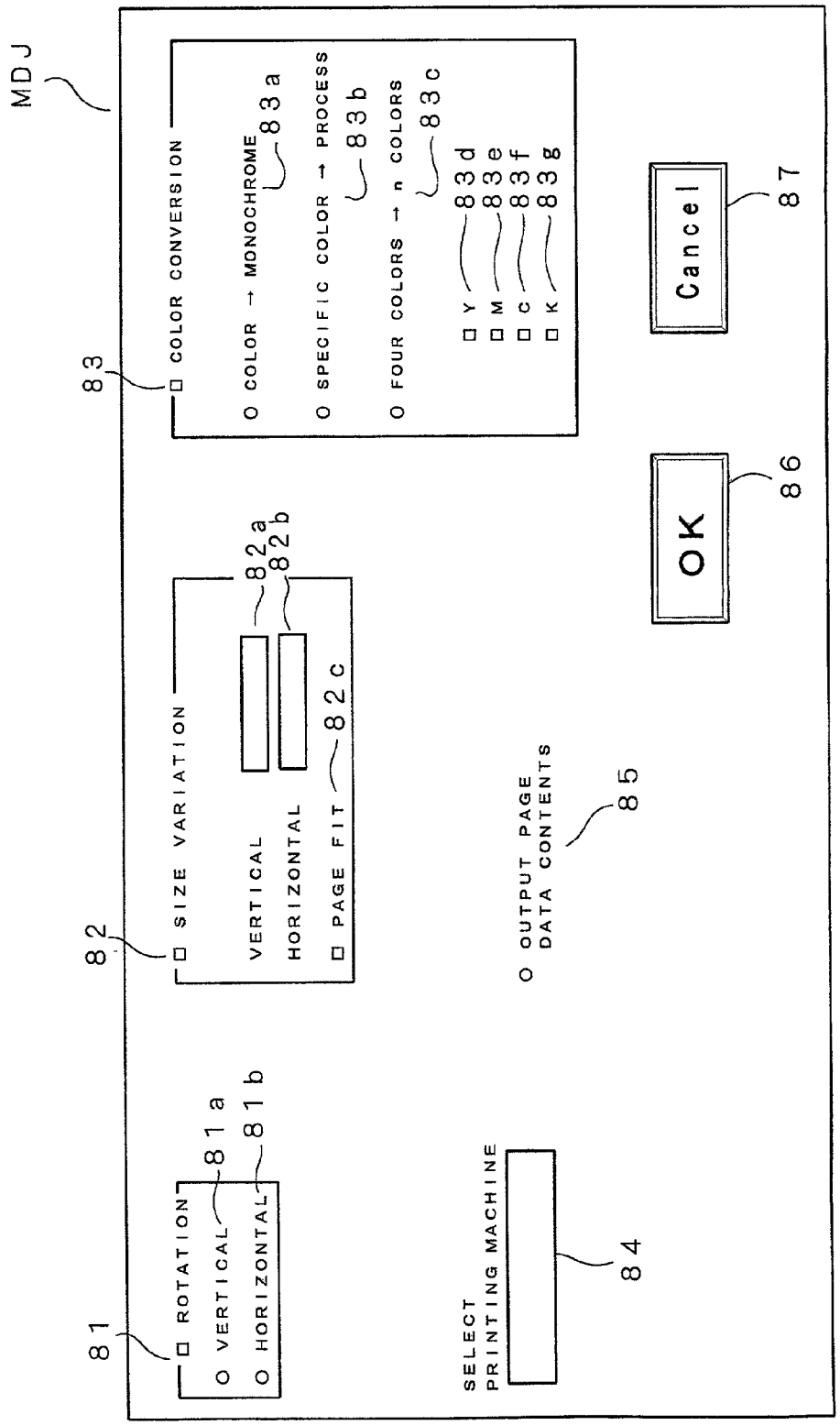

FIG. 8A shows an output processing entry menu MDJ for creating output processing information set for such a situation. The output processing menu MDJ, comprising a page rotation set field 81, a page size variation set field 82, a page color conversion set field 83, a printing machine selection field 84, a page data contents output field 85, an OK button 86 and a cancel button 87 as items used for creating output processing information, is displayed on the display part 12 by the page data output processing part 176.

The page rotation set field 81 is employed for making entry for enabling execution of printing in the digital printing machine 21, 22 or 23 by rotating the printing image expressed by the page data PD when the paper direction of the page data PD is different from that in the digital printing machine 21, 22 or 23.

Therefore, the page rotation set field 81 comprises a vertical rotation button 81a and a horizontal rotation button 81b. The vertical rotation button 81a is pressed for changing a horizontal printing image expressed by the page data PD to a vertical image. The horizontal rotation 81b is pressed for changing a vertical printing image expressed by the page data PD to a horizontal image. When the operator presses the rotation button 81a or 81b through the input part 13, the page data rotation part 1761 performs rotation processing on the printing image expressed by the page data PD. Thus, printing is enabled also when the printing direction of the page data PD is different from the paper printing direction in the digital printing machine 21, 22 or 23.

The page size variation set field 82 is used for enabling execution of printing in the digital printing machine 21, 22 or 23 by varying the size of the printing image expressed by the page data PD when the paper size of the page data PD is different from that in the digital printing machine 21, 22 or 23.

Therefore, the page size variation set field 82 comprises a vertical size variation ratio entry field 82a, a horizontal size variation ratio entry field 82b and a page fit entry field 83c. When the operator enters numerical values indicating desired size variation ratios in the size variation ratio entry fields 82a and 83b, the page data size variation part 1762 performs size variation processing on the printing image expressed by the page data PD at the size variation ratios entered in the size variation ratio entry fields 82a and 82b. When the operator makes an entry in the page fit entry field 83c, the page data size variation part 1762 performs size variation processing in response to the size of the printing papers PA. In other words, the page data size variation part 1762 executes size variation processing so that the printing size of the page data PD matches with the size of the printing papers PA used in the digital printing machine 21, 22 or 23 selected by the printing machine selection field 84 described later. Thus, printing is enabled also when the paper size of the page data PD is different from that in the digital printing machine 21, 22 or 23.

The page color conversion set field 83 is used for making an entry for enabling execution of printing in the digital printing machine 21, 22 or 23 by performing color conversion on the printing image expressed by the page data PD when the number of printing colors in the page data PD is different from that in the digital printing machine 21,22 or 23.

Therefore, the page color conversion set field 83 comprises a monochrome conversion button 83a, a process color conversion button 83b and a decolorization button 83c. The monochrome conversion button 83a is employed for specifying conversion of a printing image expressed in four colors Y, M, C and K to a monochrome image of black or the like, for example. The process color conversion button 83b is employed for specifying conversion of a printing image expressed in a color (referred to as a specific color) other than Y, M, C and K to an image expressed in Y, M, C and K. The decolorization button 83c is employed for specifying conversion of a printing image expressed in the four colors Y, M, C and K to an image expressed in two colors M and C, for example. When pressing the decolorization button 83c, the operator also presses any of color specification buttons 83d to 83g. The color specification buttons 83d, 83e, 83f and 83g are employed for specifying the colors Y, M, C and K respectively. When the operator presses any of the color specification buttons 83d to 83g, the printing image expressed by the page data PD is expressed only in the color specified by the pressed color specification button 83d, 83e, 83f or 83g.

While some of the color specification buttons 83d to 83g can be simultaneously pressed, all color specification buttons 83d to 83g cannot be simultaneously pressed.

When the operator makes an entry in the page color conversion set field 83, the page data color conversion part 1763 performs color conversion on the printing image expressed by the page data PD, whereby printing processing can be executed also when the number of printing colors in the page data PD is different from that in the digital printing machine 21, 22 or 23.

The printing machine selection field 84 is employed for selecting the printing machine for outputting the page data PD subjected to the output processing according to the output processing information. When the operator selects the desired digital printing machine from the printing machine group 2 connected to the controller 1 and enters the same in the printing machine selection field 84, the selected digital printing machine outputs the printing image of the page data PD subjected to the output processing.

When the process color conversion button 83b or the decolorization button 83c is pressed in the page color conversion set field 83, it is desirable to disable the printing machine selection field 84 to select a digital printing machine capable of performing only monochrome printing.

The page data contents output button 85 is pressed for printing the contents of the page data PD without printing the printing image expressed by the page data PD when the page data PD cannot be printed by the printing machine 21, 22 or 23 forming the printing machine group 2 unless the same is subjected to output processing. When the page data PD is described in a page description language and the operator presses the page data contents output button 85, the page data output processing part 176 acquires the description contents of the page data PD for printing the description contents of the page data PD by the digital printing machine 21, 22 or 23 selected by the printing machine selection field 84.

When satisfied with the contents of the output processing entry menu MDJ, the operator presses the OK button 86. Thus, the page data output processing part 176 creates output processing information DD. In order to interrupt output processing or when not satisfied with the contents of the output processing, the operator presses the cancel button 87 for interrupting the processing.

FIG. 8B shows the structure of the output processing information data DD created by the page data output processing part 176 due to the entry through the output processing entry menu MDJ. As shown in FIG. 8B, the output processing information data DD stores information related to rotation, size variation and color conversion on the page data PD and the digital printing machine 21, 22 or 23 for performing printing.

Thus, when the operator enters desired items in the output processing entry menu MDJ as to the printed pages, output processing information referred to for printing the page data PD is created.

At a step S3, the operator creates the page data PD and the book data BD formed by the page data PD with the terminal 4 and transmits the same to the controller 1 through the network 3. The operator arranges characters, images, line drawings etc. on pages subjected to specification of a desired paper size through a layout application (not shown) of the terminal 4 for creating a plurality of page data PD. The page data PD, generally created in a page description language, may be created in another system. In order to efficiently create the printed matter by the printing system 100, the book data BD formed by the plurality of page data PD is created at the terminal 4.

FIG. 9 is a diagram for illustrating exemplary structures of the page data PD and the book data BD. The book data BD is formed by page data PD1 to PD4. The header part of the book data BD stores a name "book1.bd" of the book data BD, and a numeral "4" as the total page number of the printed matter according to the book data BD. The total page number of the book data BD matches with the number of the page data PD forming the book data BD.

The page data PD1 to PD4 store information related to paper sizes and layouts and object data such as characters, images and line drawings for forming printing images respectively. The page data PD1 stores the paper size "A3". Further, the page data PD1 stores text data "dog.txt" and image data "dog.tif" as object data for forming the printed matter, and sets offset values (x1, y1) and (x2, y2) indicating arrangement positions of the object data respectively. Each offset value indicates the position where the lower left point of the corresponding object data is arranged on the basis of the lower left points of the papers. The page data PD1 further sets "Y, M, C and K" as the printing colors. This indicates that the page data PD1 must be printed in four colors. In addition, the page data PD1 sets "coat" as the type of the papers. The type of the papers is employed for specifying the type of the printing papers for printing the page, and this indicates that the printing image of the page data PD1 is to be printed on coat papers in this case. The page data PD1 sets "horizontal" as the printing direction. In other words, it is specified that the page data PD1 is vertically printed.

The page data PD2 to PD4 are similar in structure to the page data PD1, while the page data PD2 has set information for a paper size "A4" and a printing direction "vertical", the page data PD3 has set information for a paper size "A4", a printing color a paper type "plain paper" and a printing direction "vertical" and the page data PD4 has set information for a paper size "A3", a printing color "K" and a paper type "plain paper". Thus, it is understood that the page data PD1 to PD4 perform printing in different modes respectively.

The book data BD may alternatively be created as a data file of the recently widely used PDF system. In this case, the set information "paper type" cannot be described in the PDF file storing the page contents. Therefore, the book data BD is transmitted to the controller I as that obtained by combining the PDF file storing the information related to the page contents and set information for setting paper types for the respective pages.

The set information as to the "paper sizes", "printing colors" and "printing directions" may also be created independently of the page data PD, to be appended to the book data BD.

The created book data BD is transmitted to the controller 1 and stored in the storage part 15.

At a step S4, the controller 1 compares the set information of the page data PD stored in the book data BD transmitted from the terminal 4 with the condition information set at the step S2, thereby selecting the digital printing machine 21, 22 or 23 for printing the page data PD.

First, the set information extraction part 172 reads the book data BD from the storage part 15 and extracts set information data SD for the page data PD forming the book data BD. Each page data PD also has information related to setting of the paper size for printing the printing image, the printing color, the paper type, the printing direction etc. in addition to the object data for forming the printing image as shown in FIG. 9, and hence the set information extraction part 172 extracts such set information data SD every page data PD and temporarily preserves the same for a subsequent process.

Then, the extracted condition determination part 173 compares the condition information set at the step S2 with the set information for each page data PD extracted by the set information extraction part 172. The objects compared by the extracted condition determination part 173 are items provided in the condition information and the set information in common, and the information stored in the items "paper sizes", "printing colors", "paper types" and "printing directions" corresponds to the objects of comparison. The extracted condition determination part 173 successively compares the information stored in the respective items of condition information data JD1 to JD3 created at the step S2 with information stored in the respective items of set information data SD1 to SD4. When the information stored in the respective items entirely matches with the information stored in the corresponding items of any of the condition information data JD1 to JD3 as to each of the set information data SD1 to SD4, it is assumed that the page data PD from which the set information data SD is extracted satisfies conditions of the condition information data JD for shifting to selection of the digital printing machine 21, 22 to 23. This comparison is performed on all set information data SD.

Comparing the condition information data JD1 with the set information data SD1 extracted from the page data PD1, for example, the information stored in the items of the condition information data JD1 indicates the page size "A4", the printing colors "Y, M, C and K", the paper type "coat paper" and the printing direction "horizontal". On the other hand, the set information data SD1 indicates a page size "A3", printing colors "Y, M, C and K", a paper type "coat paper" and a printing direction "horizontal". Thus, the former mismatches with the latter as to the paper size, and hence it is understood that the page data PD1 from which the set information data SD1 is extracted does not satisfy the condition information data JD1. Then, the extracted condition determination part 173 compares the set information data SD1 with the condition information data JD2 and JD3, to prove that the conditions still mismatch with each other. The process shifts to processing at a step S5 as to the page data PD proved to have no condition information matching with the set information.

Then, the set information data SD2 is compared with the condition information data JD1. In this case, the information stored in the items of the set information data SD2 and the condition information data JD1 entirely matches and hence it is proved that the page data PD2 from which the set information data SD2 is extracted satisfies the condition information data JD1. Thus, the process shifts to a step S6.

Thereafter the set information data SD3 and SD4 are also compared with the condition information data JD1 to JD3.

At the step S5, the page data PD from which the set information is extracted is subjected to output processing according to the output processing information when the set information mismatches with the condition information. When certain set information mismatches with the condition information, it means that no digital printing machine suitable for printing the page data PD from which the set information data SD is extracted is connected to the printing system 100. When the output processing according to the output processing information is performed on the page data PD, therefore, the page data PD is rendered printable by the digital printing machine 21, 22 or 23 connected to the printing system 100. The page data output processing part 176 executes rotation, size variation processing and/or color conversion processing on the page data PD on the basis of the output processing information data DD created at the step S2 and further specifies the digital printing machine 21, 22 or 23 for printing, thereby enabling outputting of the page data PD mismatching with the condition information although the printing quality is reduced from initial setting. In this case, size variation processing for reducing the A3 size to the A4 size is performed on the page data PD1 according to the output processing information data DD. The output processing information DD specifies the digital printing machine 22 capable of printing only a monochrome image, and hence the page data output processing part 176 also performs color conversion from color printing to monochrome printing. In addition, the printing direction is changed from "horizontal" to "vertical" on the basis of the output processing information data DD. The information as to the paper type stored in the set information of the page data PD1 is ignored due to the specification of the digital printing machine 22 for printing. Thus, page data PD1' having the set information of the paper size "A4", the printing color "K" and the printing direction "vertical" is obtained.

When "output page data contents" is specified when the output processing information data DD is created at the step S2, no output processing is performed according to the output processing information but a specified printing machine 21, 22 or 23 prints the file contents of the page data PD as such. Thus, the operator can confirm the file contents of the page data PD mismatching with the condition information, whereby a printing operation not sacrificing the printing quality can be performed by correcting the set information of the page data PD, the condition information or the output processing information. The page data PD may be output by another printing system after confirming the file contents of the page data PD.

The aforementioned step is executed also when no digital printing machine for printing the page data PD is connected to the printing system 100 although the set information matches with the condition information.

At the step S6, rasterize (RIP) processing for creating the printing data RPD is performed on the page data PD forming the book data BD. The controller 1 extracts the page data PD from the book data BD and performs RIP processing by an RIP part (not shown), for creating the printing data RPD every rasterized page data PD. Page data PD matching with the condition information as the result of the determination at the step S4 is extracted from the book data BD and thereafter rasterized without changing the page size, the direction or the printing color, while page data PD subjected to output processing according to the output processing information through the step S5 is rasterized with the size, the direction or the printing color specified by the output processing information data DD. Through the aforementioned steps, printing data RPD1' created by rasterizing the page data PD1' subjected to size variation processing and color conversion processing and printing data RPD2 to RPD4 created by rasterizing the page data PD2 to PD4 as such can be obtained from the page data PD1 to PD4 forming the book data BD1.

When "output page data contents" is specified in creation of the output processing information data DD at the step S2, no RIP processing is performed on the page data PD mismatching with the condition information. This is because the specified printing machine 21, 22 or 23 prints the file contents of the page data PD as such at the step S5.

At a step S7, the digital printing machine 21, 22 or 23 is selected from the printing machine group 2 for printing the printing data RPD created at the aforementioned step S6. The printing machine selection part 175 compares information of items related to each digital printing machine 21, 22 or 23 registered in the printing machine management table 1751 with information of the respective items of the condition information. When the information "paper size", "printing color", "paper type" and "printing direction" of the respective items related to the digital printing machine 21, 22 or 23 registered in the printing machine management table 1751 matches with the information "paper size", "printing color", "paper type" and "printing direction" of the respective items of the condition information data JD, the digital printing machine 21, 22 or 23 is selected as that for printing the printing data RPD created from the page data PD having the set information matching with the condition information. The information of the respective items related to the digital printing machine 21 matches with the condition information data JD1 in this case, and hence the digital printing machine 21 is selected as that for printing the printing data RPD2 created from the page data PD2 having the set information data SD2 matching with the condition information data JD1. Similarly, the digital printing machines 22 and 23 are selected as those for printing the printing data RPD3 and RPD4 respectively. As to the page data PD1 mismatching with the condition information, the digital printing machine 22 specified by the output processing information data DD when subjected to the output processing at the step S5 outputs the printing data RDP1' created from the page data PD1'.

Figure 10:
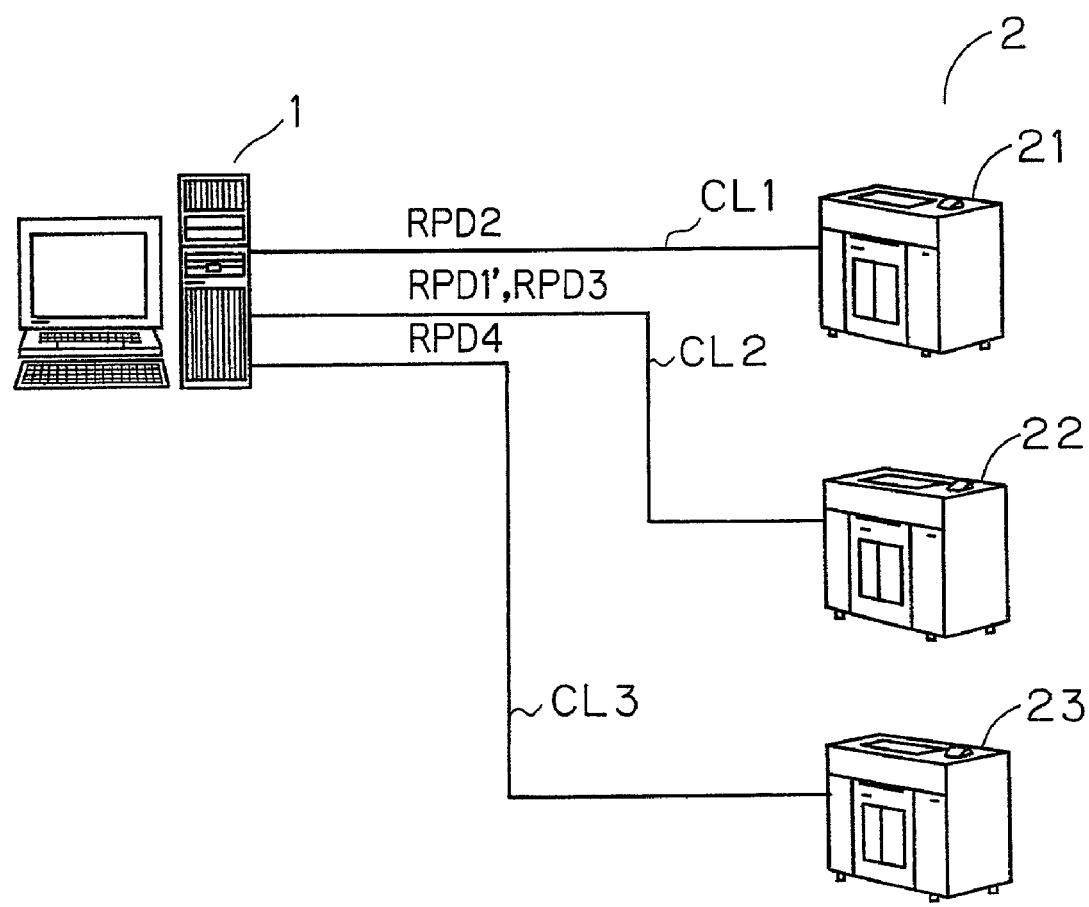
FIG. 10 is a diagram for showing a state of selecting the printing machine group 2 for performing printing of printing data RPD.

FIG. 10 illustrates the printing machine group 2 for printing the printing data RPD selected through the step S7.

The digital printing machine 21, 22 or 23 printing the page data PD having set information matching with the condition information may alternatively be set at the step S2 for creating the condition information. In this case, it follows that the condition information data JD stores information related to the digital printing machine 21, 22 or 23 for printing, and hence the printing machine selection part 175 refers to the condition information data JD for selecting the digital printing machine 21, 22 or 23 for printing the printing data RPD.

At a step S8, page data allocation information indicating the relation between each digital printing machine 21, 22 or 23 forming the printing machine group 2 and the printing data RPD printed by the selected digital printing machine 21, 22 or 23 is created. The page data printing allocation information creation part 177 creates page data printing allocation information from the relation between the digital printing machines 21, 22 and 23 forming the printing machine group 2 and the printing data RPD1' to RPD4.

FIG. 11A illustrates exemplary page data printing allocation information WD created by the page data printing allocation information creation part 177. The page data printing allocation information WD stores flag data indicating that each printing data RPD is executed/not executed printing by each digital printing machine 21, 22 or 23. For example, the digital printing machine 21 prints the printing data RPD2 without printing the remaining printing data RPD1', RPD3 and RPD4, and hence "1" is set to the flag of the printing data RPD2 while "0" is set to the flags of the remaining printing data. The digital printing machine 22 prints the printing data RPD1' and RPD3, and hence "1" is set to the flags of the printing data RPD1' and RPD3 while "0" is set to the flags of the remaining printing data. As to the digital printing machine 23, "1" is set to the flag of the printing data RPD 4, while "0" is set to the flags of the remaining printing data.

Each digital printing machine 21, 22 or 23 can create information as to which pages are printed and which pages are not printed through the page data printing allocation information WD. As shown in FIG. 11B, the page data printing allocation information creation part 177 creates display page data allocation information HWD by allocating the name of the digital printing machine 21, 22 or 23 as to the page data PD from which the printing data RPD is created for displaying the same on the display part 12 or properly printing the same, to be capable of indicating which pages are printed by which digital printing machine to the operator.

The page data PD1 is displayed as PD1' for indicating that the output processing is performed at the step S5. The original page data PD1 may be displayed in FIG. 11B.

At a step S9, the controller 1 transmits the printing data RPD and the printing non-execution information NPD for performing printing by the printing machine group 2 to each digital printing machine 21, 22 or 23. The printing execution information creation part 178 creates the printing non-execution information NPD, the substance of which is a control signal for executing ejection position change or slip paper insertion in each digital printing machine 21, 22 or 23.

The printing execution information creation part 178 acquires the flag data of the printing data RPD in each digital printing machine 21, 22 or 23 stored in the page data printing allocation information WD created at the step S8 for creating printing execution information GPD consisting of the printing data RPD and the printing non-execution information NPD. For example, the digital printing machine 21 does not print the printing data RPD1', RPD3 and RPD4, and hence "0" is set to the flag of the corresponding printing data RPD in the page data printing allocation information WD. The printing execution information creation part 178 inserts the printing non-execution information NPD in a portion corresponding to the flag "0" in the printing execution information GPD. When the flag "0" is continuous, the printing execution information creation part 178 does not continuously insert the printing non-execution information NPD, in order to prevent complicated change of the ejection position or wasteful slip paper insertion.

Figure 12A:
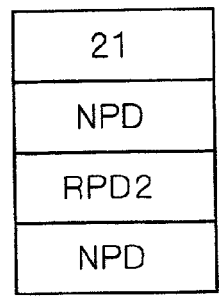
FIGS. 12A, 12B and 12C are diagrams for showing the structure of printing execution information GPD created by a printing execution information creation part 178.
Figure 12B:
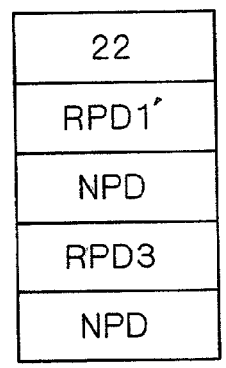
Figure 12C:
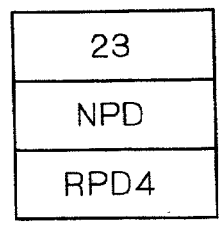

Consequently, printing execution information GPD21 created by the printing execution information creation part 178 and to be transmitted to the digital printing machine 21 is formed by the printing non-execution information NPD, the printing data RPD2 and the printing non-execution information NPD as shown in FIG. 12A. Similarly, the printing execution information creation part 178 creates printing execution information GPD22 and GPD23 shown in FIGS. 12B and 12C to be transmitted to the digital printing machines 22 and 23 respectively.

The printing control part 179 transmits the created printing execution information GPD to each specified digital printing machine 21, 22 or 23 through the communication line CL for making the same execute printing. Each digital printing machine 21, 22 or 23 performs printing on the basis of the printing data RPD while performing ejection position change or slip paper insertion on the basis of the printing non-execution information NPD.

Thus, the printing system 100 shown in FIG. 1 executing the process shown in FIG. 5 can decide the printing machine for printing each page on the basis of the set information of the page data included in the book data by first setting the condition information specifying the printing machine for printing the page data without specifying the printing machine for printing the page data through the operator when printing book data including page data to be printed with different page sizes, printing colors, paper types and printing directions in a mixed manner. Thus, pages having different styles can be printed through proper printing machines, whereby the burden on the operator can be reduced and efficiency of the printing operation can be improved.

Further, each digital printing machine executes ejection position change or slip paper insertion on the basis of a portion of non-printed page data, whereby efficiency of a later bookbinding step can also be improved.

"Modifications"

The present invention is not restricted to the aforementioned embodiment.

While the printing machine group 2 is directly connected to the controller 1 in the above description, for example, the controller 1 may alternatively directly communicate with the controllers of the digital printing machines 21, 22 and 23 forming the printing machine group 2 through the communication lines CL thereby embodying the present invention.

In this case, page data PD having set information matching with condition information is transmitted to the controller of each selected digital printing machine to be capable of making the controller perform RIP processing on the page data PD in a parallel manner, whereby the efficiency of the printing operation is improved.

The controller of each digital printing machine may contrarily embody the present invention, thereby executing printing processing in a parallel manner.

Also in this case, the controller of each digital printing machine compares condition information with set information in a parallel manner for performing RIP processing on the page data PD, whereby the efficiency of the printing operation is improved.

While the printing system 100 having the printing machine group 2 formed by the digital printing machine 21, 22 and 23 has been described, the present invention is also applicable to a printing system having a single digital printing machine capable of executing different types of printing, i.e., a digital printing machine having the functions of the digital printing machines 21, 22 and 23.

The terminal 4 may alternatively create the condition information for appending the condition information data JD to the book data BD and transmitting the same to the controller 1.

In this case, the controller 1 may not create condition information, and hence the processing efficiency of the controller 1 can be improved.

Further, the terminal 4 may extract set information for appending the set information data SD to the book data BD and transmitting the same to the controller 1.

In this case, the controller 1 may not extract the set information, whereby the processing efficiency in the controller 1 can be improved.

While the invention has been shown and described in detail, the foregoing description is in all aspects illustrative and not restrictive. It is therefore understood that numerous modifications and variations can be devised without departing from the scope of the invention.

What is claimed is:

1. A printing system capable of printing a plurality of pages forming a book, comprising:
   a) a plurality of printing apparatuses;
   b) a terminal creating book data including a plurality of page data accompanied with printing set information; and
   c) a controller comprising:
   an element receiving said book data from said terminal,
   an element performing RIP processing on said plurality of page data for creating a plurality of printing data respectively,
   an element holding printing condition information for said plurality of printing apparatuses,
   an element comparing said printing set information with said printing condition information and selecting a printing apparatus to be used for printing each page from said plurality of printing apparatuses according to said printing set information thereby specifying allocation of said plurality of printing data to at least part of said plurality of printing apparatuses, a conversion element converting page data having said printing set information mismatching with said printing condition information to proper page data printable in any of said plurality of printing apparatuses by selectively executing any of page rotation, page size variation, and page color conversion, and an element distributing said plurality of printing data to at least part of said plurality of printing apparatuses according to said allocation, each said printing apparatus forming an image on a paper on the basis of objective printing data received from said controller.

2. A controller used in a printing system comprising a plurality of printing apparatuses, comprising:

an element receiving book data for a book including a plurality of page data accompanied with printing set information from a terminal;

an element performing RIP processing on said plurality of page data and creating a plurality of printing data respectively;

an element holding printing condition information for said plurality of printing apparatuses;

an element comparing said printing set information with said printing condition information and selecting a printing apparatus to be used for printing each page from said plurality of printing apparatuses thereby specifying allocation of said plurality of printing data to at least part of said plurality of printing apparatuses; and a conversion element converting page data having said printing set information mismatching with said printing condition information to proper page data printable in any of said plurality of printing apparatuses by selectively executing any of page rotation, page size variation, and page color conversion.

3. The controller according to claim 2, wherein said printing condition information includes information specifying the size of a printing paper.

4. The controller according to claim 2, wherein said printing condition information includes information specifying the number of printed colors.

5. The controller according to claim 2, wherein said printing condition information includes information specifying the type of a printing paper.

6. The controller according to claim 2, wherein said printing condition information includes information specifying a page printing direction.

7. The controller according to claim 2, further comprising:
a display element displaying the result of said allocation.

8. The controller according to claim 2, further comprising:

an element dividing a plurality of pages of said book into at least one page to be printed and the rest of said plurality of pages not to be printed for each of said plurality of printing apparatuses according to said allocation, and an element creating composite data for said each of said plurality of printing apparatuses by extracting printing data corresponding to said at least one page to be printed from said plurality of printing data while associating a page skip signal with said rest of said plurality of pages not to be printed and transmitting said composite data respectively to said each of said plurality of printing apparatuses.

* * * * *